United States Patent
Deneir et al.

(10) Patent No.: US 6,966,180 B2
(45) Date of Patent: Nov. 22, 2005

(54) CONTROL ARRANGEMENT AND METHOD FOR A HYDRAULIC SYSTEM

(75) Inventors: Stephan P. G. Deneir, Moorslede (BE); Steven C. Young, Lancaster, PA (US)

(73) Assignee: CNH America LLC, Racine, WI (US)

( * ) Notice: Subject to any disclaimer, the term of this patent is extended or adjusted under 35 U.S.C. 154(b) by 94 days.

(21) Appl. No.: 10/477,686

(22) PCT Filed: May 15, 2002

(86) PCT No.: PCT/EP02/05484

§ 371 (c)(1),
(2), (4) Date: Nov. 14, 2003

(87) PCT Pub. No.: WO02/093043

PCT Pub. Date: Nov. 21, 2002

(65) Prior Publication Data

US 2004/0141849 A1 Jul. 22, 2004

(30) Foreign Application Priority Data

May 16, 2001 (GB) ............................................. 0111918

(51) Int. Cl.[7] ............................................. F16D 33/00
(52) U.S. Cl. .............................. 60/327; 60/329; 60/445
(58) Field of Search .................................. 60/329, 445

(56) References Cited

U.S. PATENT DOCUMENTS 5,352,095 A * 10/1994 Tanaka et al. ................. 417/12
5,941,689 A * 8/1999 Skirde .......................... 417/32

FOREIGN PATENT DOCUMENTS

| DE | 199 30 056 C1 | 6/1999 |
|---|---|---|
| DE | 199 34 782 A1 | 7/1999 |
| EP | 0 035 987 A2 | 9/1981 |
| EP | 0 573 734 A1 | 12/1993 |
| FR | 2552683 | 4/1985 |

* cited by examiner

*Primary Examiner*—Edward K. Look
*Assistant Examiner*—Devin Hanan
(74) *Attorney, Agent, or Firm*—Rebecca Henkel; Brant T. Maurer

(57) ABSTRACT

A control arrangement for a hydraulic system is disclosed. The system comprises a variable displacement hydraulic pump (4), which is connected with a hydraulic drive motor (16) by a supply line (11) and a return line (12). The system also includes a pump controller (4a) which is adapted to vary the displacement of the pump (4). The control arrangement includes a first feedback element in the form of an oil temperature sensor (19), which provides the pump controller (4a) feedback of the evolution of the oil temperature. The pump controller (4a) is adapted in vary the displacement of the pump (4) in response to said feedback. A second feedback element is constituted by a pressure limiter valve (15c), which provides to the pump controller (4a) feedback of the pressure in at least a feedback portion (12a) of the return line (12).

37 Claims, 3 Drawing Sheets

CONTROL ARRANGEMENT AND METHOD FOR A HYDRAULIC SYSTEM

Figure 1:
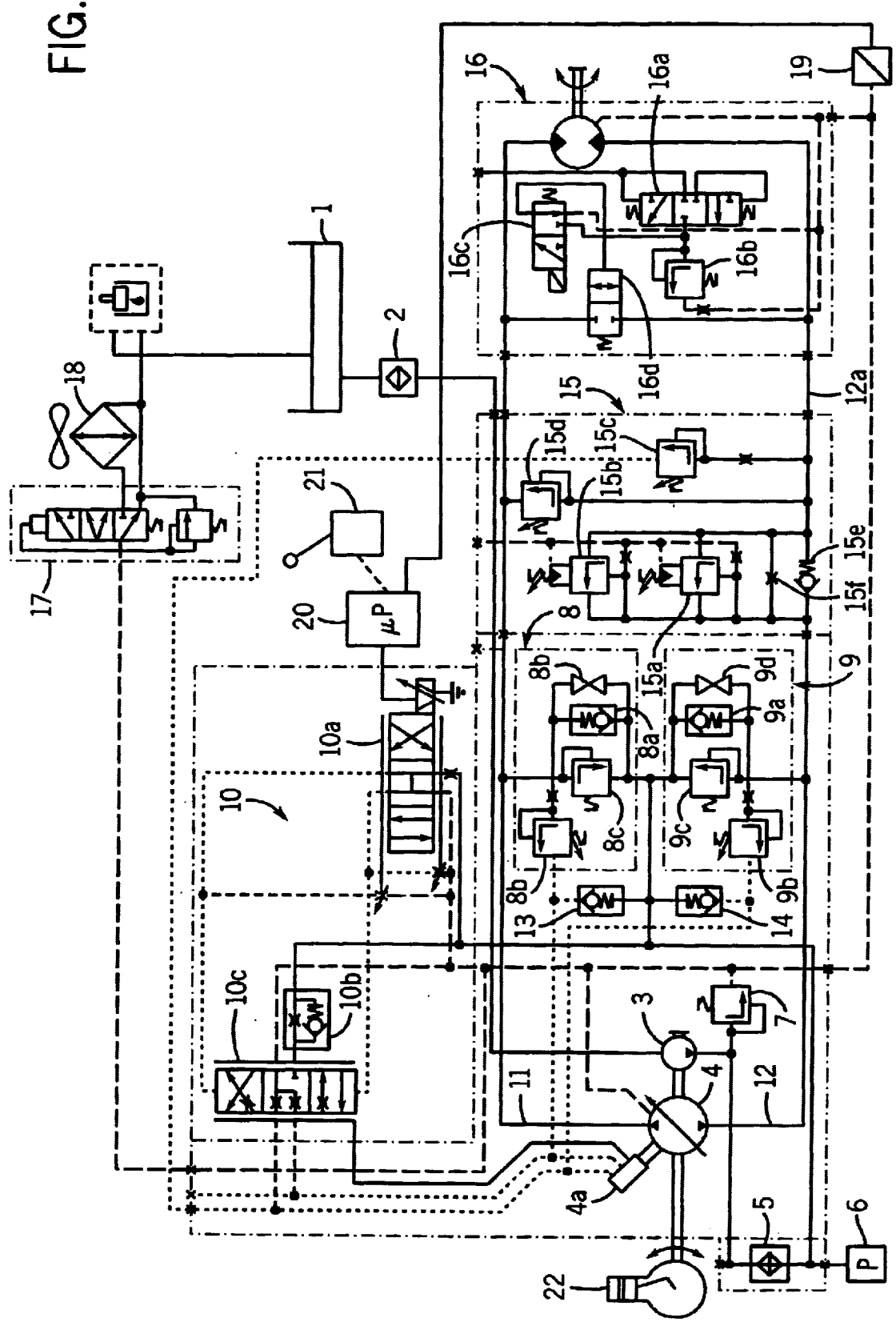

This invention relates to control arrangements and methods and in particular to control arrangements and methods for a hydraulic system, e.g. including a hydrostatic drive for agricultural vehicles and farm equipment.

It is known to provide a control arrangement for a hydraulic system having a prime mover powered pump driving a hydraulic motor and prior art arrangements of this type are disclosed in, for example, U.S. Pat. No. 5,941,689 and U.S. Pat. No. 4,694,648. Each of these systems includes a hydrostatic transmission having a variable displacement hydraulic pump adapted to drive a fixed displacement hydraulic drive motor through a high pressure working line and to receive returning hydraulic fluid through a low pressure working line. One known application of such hydraulic systems is to provide a drive arrangement for a machine, for example a vehicle such as a rotary combine harvester as disclosed in particular in U.S. Pat. No. 4,694,648. The prime mover is typically a diesel engine.

A characteristic of some known prior art hydrostatic systems is their ability to transmit power in both directions, i.e. from the pump to the motor as driving or traction power in one direction and also from the motor to the pump as braking power in the other. The braking power applied to the pump is often transmitted to the prime mover through a mechanical drive such as a pump drive shaft and is experienced by the prime mover as a braking torque. The ability of some current prime movers to absorb braking torque does not match their ability to provide driving torque. If the braking torque at the prime mover/pump exceeds either unit's rated limit, damage may occur through, for example, overspeeding.

The above mentioned overspeeding condition might occur, for example, if an operator were to be driving the machine downhill in a high gear or were to implement a hydrostatic stop under unfavourable circumstances. By way of explanation, a hydrostatic stop is performed by the rapid movement of a hydrostatic control lever from a drive position to a neutral (no power) position.

In order to reduce the braking torque applied to the prime mover and hence the overspeeding risk, the hydraulic circuit may be provided with a brake valve in its return line, as shown in U.S. Pat. No. 6,360,537. This valve limits the pressure in the return line. However, the combination of the continuous oil flow and the pressure drop over the valve generates a lot of heat, which eventually exceeds the cooling capacity of the hydraulic system. Consequently, the oil temperature is rapidly rising and may reach the level where it start to cause damage or premature wear to the hydraulic components.

It is an object of this invention to remedy to this problem and to provide an improved control arrangement and an improved control method for a hydraulic system.

According to a first aspect of the present invention, a control arrangement for a hydraulic system is provided, comprising a variable throughput hydraulic pump connected with a hydraulic motor by a supply line and a return line for transfer of working fluid, and a pump controller means adapted to vary the throughput of said pump, the pump driving the motor in a traction operation mode and the motor driving the pump in a braking mode wherein said control arrangement includes a feedback element which provides to said pump controller means feedback of a temperature of the working fluid, said pump controller means being adapted to vary the throughput of said pump in response to said feedback.

The controller means may be adapted to reduce the pump throughput when the temperature exceeds a first temperature. Initially, the throughput may be reduced by a first amount. When the temperature does not drop below this first temperature after a predetermined time period, the pump throughput may be reduced by a second amount. Further reductions may follow if the temperature is still too high after a second predetermined time period.

The reduction may take the form of reduction by a factor, i.e. a multiplication by a variable smaller than 1. The first reduction may be smaller than the second and further reductions.

When the temperature has fallen to an acceptable level, the throughput of the pump may be increased again stepwise, e.g. by applying factors greater than 1, until the initially desired speed has been reached again.

The hydraulic system may comprise a variable throughput hydraulic pump connected with a hydraulic motor by a supply line and a return line, and a pump controller means adapted to vary the throughput of said pump, wherein said control arrangement includes a feedback element which provides to said pump controller means feedback of a pressure in at least a feedback portion of said return line, said pump controller means being adapted to vary the throughput of said pump in response to said feedback.

Said pump controller means may be adapted to limit, in response to said feedback, an output pressure of said pump to a predetermined level. Said predetermined level may comprise a pressure in the region of 400 bar.

Said hydraulic system may further comprise a charge circuit and a check valve connecting said supply line and said charge circuit, said check valve being operable in response to said feedback and being adapted, when operated, to connect said supply line and said charge circuit.

Said return line may include a braking flow control element adapted to control the flow of a working fluid in said return line during braking. Said feedback portion may be located in said return line between said motor and an outlet of said brake element.

Said hydraulic system may comprise a hydrostatic system and said feedback may comprise feedback of a return line pressure existing during a hydrostatic stop of said hydraulic system.

Said feedback element may comprise a pressure limiter valve. Said feedback may comprise a hydraulic feedback signal which is provided to said pump controller means if the pressure in said feedback portion reaches or exceeds a pressure in the region of 400 bar.

Said pump may comprise a swash plate pump and said pump controller means may comprise a servo cylinder associated with said pump and which is adapted to vary the displacement of said pump by varying an angle of tilt of a swash plate of said pump.

The invention also provides a vehicle including a hydraulic control arrangement according to the invention.

In a further aspect a method is provided of controlling a hydraulic system, said system comprising a variable throughput hydraulic pump connected with a hydraulic motor by a supply line and a return line for transfer of working fluid, the pump driving the motor in a traction operation mode and the motor driving the pump in a braking mode, the method including the steps of: providing feedback of a temperature of the working fluid, and controlling the throughput of said pump in response to said feedback.

Advantageously, the method of controlling the hydraulic system includes providing feedback of a pressure in at least a feedback portion of said return line and controlling the displacement of said pump in response to said feedback.

The method may include limiting an output pressure of said pump to a predetermined level in response to said feedback.

The invention will now be described in further detail, by way of example only and with reference to the accompanying drawings.

FIG. 1 is a schematic diagram of a hydraulic control arrangement according to one embodiment of the present invention.

Figure 2:
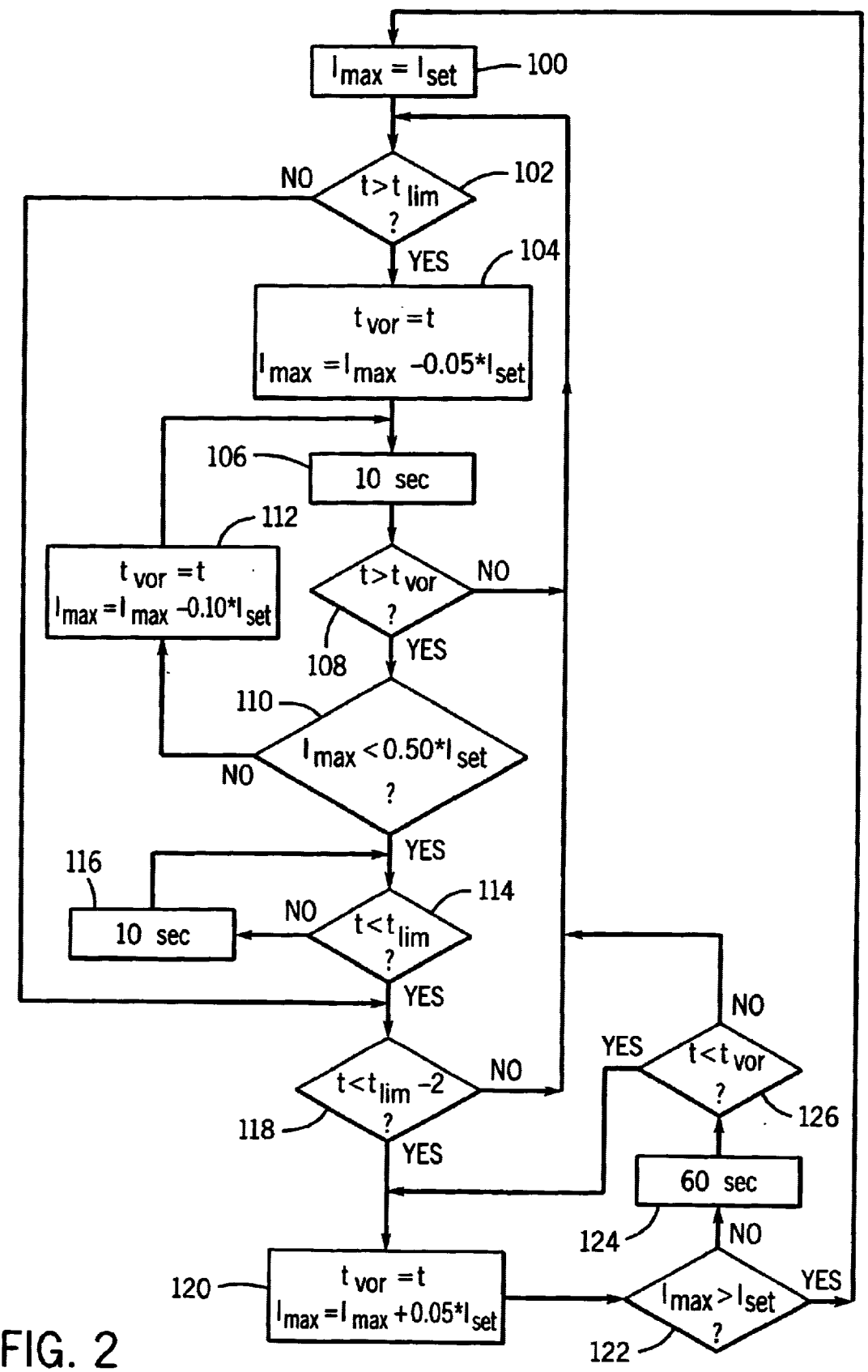

FIG. 2 a flow diagram of a temperature control algorithm in accordance with an embodiment of the present invention.

Figure 3:
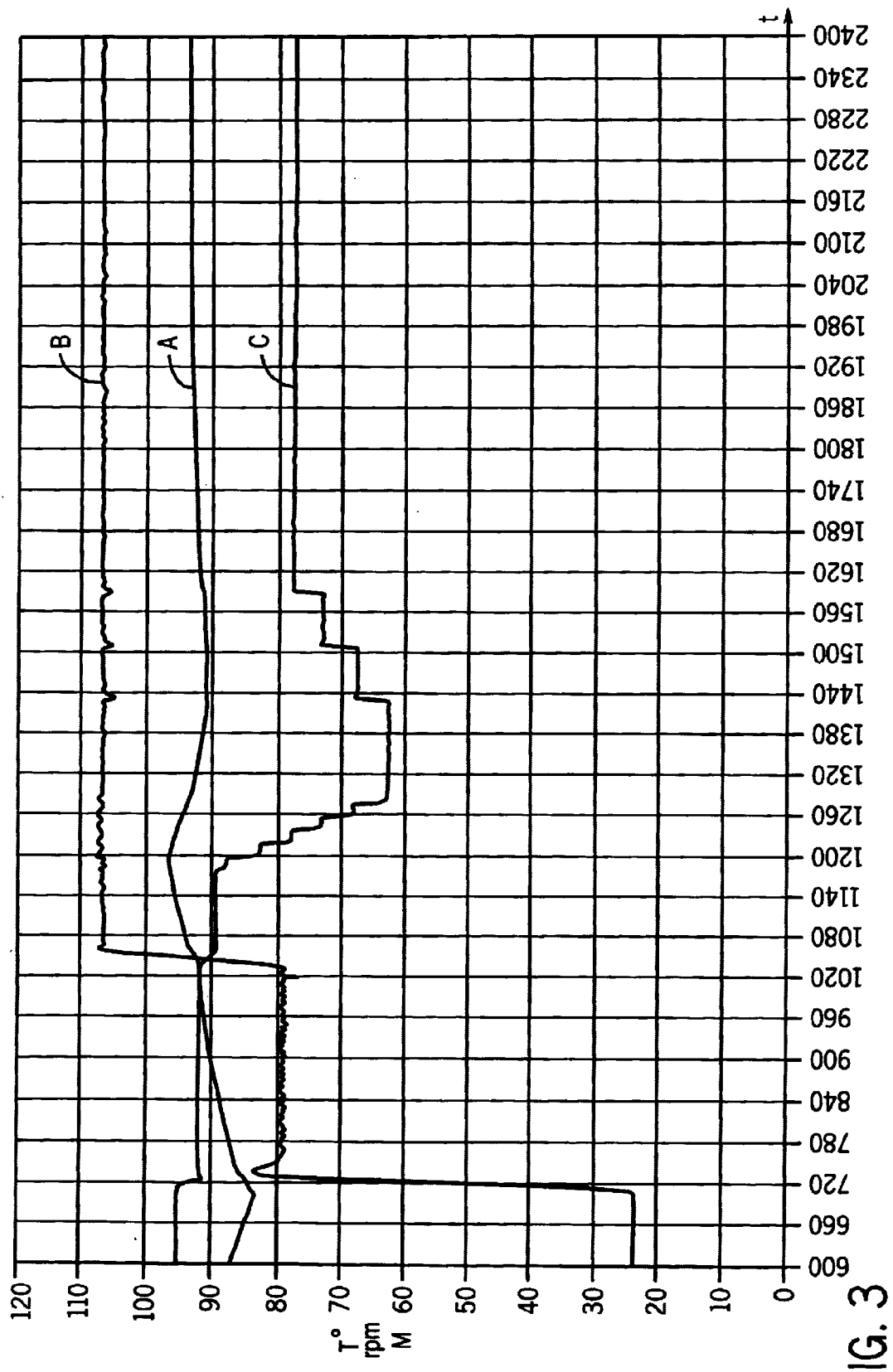

FIG. 3 is a graph showing the operation of the algorithm according to FIG. 2.

The present invention will be described with reference to certain embodiments and drawings but is not limited thereto but only by the attached claims.

Referring to FIG. 1, a hydraulic system in accordance with a first embodiment is shown schematically comprising a hydrostatic circuit having a variable displacement hydraulic drive pump 4, the motive force for which is provided by a prime mover (not shown separately) in the form, for example, of a diesel engine 22. Generally, there are two modes of driving an engine of agricultural vehicles—it is preferred if the engine is driven at constant rotational speed (RPM) and the power is varied by adjusting the amount of fuel provided to the engine. To achieve this the rotational speed of the engine is measured directly or indirectly and when this speed drops the fuel supply is increased. This mode of operation is preferred when there are auxiliary power take-off's—in this case each power take-off has a constant speed and does not vary with engine loading. In such an operational mode the speed of rotation of the drive pump is constant when the engine is driving the vehicle. However, when braking the speed of the engine 22 may increase when its braking effect is insufficient to slow the vehicle. In such circumstances various elements in the power chain such as the pump 4 may overspeed. An alternative method of operating an engine is to change power by changing engine speed.

The drive pump 4 is in closed circuit, hydrostatic, fluid communication with a hydraulic drive motor 16 through a supply line and a return line in the form (for forward drive) of first and second hydraulic lines 11, 12.

The drive pump 4 comprises a hydrostatic pump and includes a ring of servo pistons which run against a tilted plate, known in the art as a swash plate. The angle of tilt of the swash plate controls the displacement of hydraulic oil by the drive pump 4 and is altered under the control of a pump controller in the form of a servo cylinder assembly 4a. For example in an embodiment the assembly comprises a central cylinder rod, connected to the swash plate, the rod interconnecting two cylinder pistons, one being loaded for forward and the other for reverse drive. A large angle of tilt causes a large displacement of oil and a smaller angle of tilt causes a lower displacement of oil, which result respectively in higher and lower outputs from the drive pump 4.

The servo cylinder assembly 4a is controlled under the influence of a servo valve assembly 10, which comprises: a servo solenoid valve 10a, an orifice check valve 10b, and a servo valve spool 10c. A manual input is provided in the form of a proportional hydrostatic control lever 21 which controls the operation of the servo solenoid valve 10a via an electronic control device 20. Movement of the hydrostatic lever 21 forwards results in a change of the current (e.g. increases it) which is supplied to the servo solenoid valve 10a from the electronic control device 20 which moves the servo solenoid valve 10a in proportion to the position of the hydrostatic lever 21. A differential pressure is created at the output ports of solenoid valve 10a and fed to the servo spool valve 10c to bring the latter to a corresponding position. A proportional amount of charge oil is allowed to flow to a forward portion the servo cylinder 4a. Although an electronic control device 20 and a solenoid valve 10a have been described alternative control systems may be used, e.g. a mechanical movement of valve 10a, a pneumatic or hydraulic control of valve 10a.

The drive motor 16 comprises a hydrostatic drive motor assembly which operates in reverse to the drive pump 4. The drive motor 16 further comprises: a shuttle spool valve 16a, a flushing relief valve 16b, a pressure release solenoid valve 16c and a pressure release spool 16d. When pressure in either of the hydraulic lines 11, 12 rises (forward or reverse selected), pilot pressure acts on one side of the shuttle spool valve 16a and moves it to connect the low pressure line 11, 12 to the flushing relief valve 16b and pressure release solenoid valve 16c. With the drive motor 16 running in forward or reverse, the pressure in the return line 11, 12 acts on the flushing relief valve 16b which then opens the return line 11, 12 to a motor case drain line, in which an oil temperature sensor 19 is provided. The pressure release valve circuit 16c, 16d is used to provide smooth gear changes.

The first hydraulic line 11 comprises a forward high pressure line 11 and the second hydraulic line 12 comprises a reverse high pressure line 12. For forward driving, the drive pump 4 displaces oil along the forward high pressure line 11. This oil passes through the drive motor 16 causing it to rotate in a forward direction and then returns to the drive pump 4 along the reverse high pressure line 12 which, during forward operation, acts as a return line.

Interposed along the reverse high pressure line 12 is a brake element in the form of a brake manifold 15 comprising: at least one brake flow valve, e.g. first and second brake flow valves 15a, 15b which may be set to an equal pressure between 180 and 280 bar—the precise pressure being application dependent. Two valves are preferred in order to cope with large flow rates; where the oil flow remains small one valve may suffice. A feedback element in the form of a pressure limiter valve 15c (400 bar) is also provided. A pressure shock relief valve 15d (450 bar) may be provided. Also, a check valve 15e and an orifice passage 15f which forms a permanently open flow restrictor may be provided.

The system is supplied with charge oil from a reservoir 1, into which returning drain oil and charge oil are fed along a drain line which passes through a thermostatically controlled oil cooler bypass valve 17 and may also pass through an oil cooler 18 depending on the temperature of the returning oil. If the oil temperature is below approximately 490 C, the oil flows directly into the reservoir 1. If the oil temperature is above that, the bypass valve 17 diverts the returning oil through the oil cooler 18.

With the engine running and the hydrostatic lever in a neutral position, oil from the reservoir is supplied to a charge pump 3 through a 100 micron filter 2. The charge oil is then pumped through a further filter 5, its pressure being sensed at the outlet to the filter 5 by a charge oil pressure transducer 6. The charge oil is supplied under charge pressure to a forward multifunction valve assembly 8 and to a reverse multifunction valve assembly 9.

The forward multifunction valve assembly 8 is connected to the forward high pressure line 11 and comprises: a forward charge pressure check valve 8a for keeping the hydrostatic circuit 4, 11, 16, 12 full of oil; a forward pressure limiter valve 8b set to make sure that the working pressure does not exceed 420 bar; a forward high pressure relief valve 8c to protect the hydrostatic circuit 4, 11, 16, 12 from shock loads above 450 bar; and a forward bypass valve 8d to enable a vehicle to which the system might be fitted to be moved at least at slow speeds for short distances if a prime mover failure occurs.

The reverse multi-function valve assembly 9 is connected to the reverse high pressure line 12 and comprises: a reverse charge pressure check valve 9a; a reverse pressure limiter valve 9b; a reverse high pressure relief valve 9c; and a reverse bypass valve 9d. This assembly 9 is constructed and operates in a similar fashion to the forward multi-function valve assembly 8, save the variations necessary for operation in association with the reverse high pressure line 12 instead of the forward one 11.

Oil under charge pressure opens the check valves 8a, 9a and fills the drive pump 4, the forward and return lines 11, 12, the brake manifold 15 and the drive motor 16. Charge oil also fills the servo valve assembly 10.

In neutral, the swash plate in the drive pump 4 stands square to its input shaft and with no axial movement of the pistons there is no flow of high pressure oil in the lines 11, 12.

Charge pressure is controlled to 34 bar by a charge pressure relief valve 7, which is positioned on the outlet side of the charge pump 3 and relieves excess charge pressure as drain oil into the hydrostatic pump casing. The drain oil then passes into the drain line and back to the reservoir 1 through the thermostatically controlled bypass valve 17. As pressure rises in the forward high pressure line 11, the forward multi-function charge check valve 8a closes, preventing the charge circuit from being subjected to drive pressure from the drive pump 4. The charge pump 3 continues to charge the reverse high pressure line 12 through the reverse multi-function charge check valve 9a to replace any oil lost through leakage or returned to the reservoir 1 through lubrication and flushing.

If a pressure difference greater than 13 bar (application specific) arises across the drive motor 16, the drive pressure from the drive pump 4 moves the shuttle spool valve 16a. This connects the return high pressure line 12 to the flushing relief valve 16b.

The flushing relief valve 16b opens at a lower pressure than the charge pressure relief valve 7, causing some of the charge pressure oil to flow through the flushing relief valve 16b to the drive motor case drain. This helps cool the motor and pump bodies.

If the resistance/load on the drive motor 16 increases, the pressure in the forward high pressure line 11 increases. As the pressure reaches a predetermined level, e.g. 420 bar, the forward pressure limiter valve 8b opens and allows oil to flow to a reverse servo cylinder piston in the pump servo cylinder assembly 4a. This reduces the swash plate angle and thereby the output of the drive pump 4 and protects the hydrostatic system from overpressure.

To ensure that the pressure acting on the reverse servo cylinder piston does not exceed charge pump pressure, the pressure (420 bar) of the oil flowing through the forward pressure limiter valve 8b opens a check valve 13 and the charge check valve 9a, allowing the oil to flow into the charge pressure circuit. It will be noted that the pressure in the charge pressure circuit is limited to 34 bar by the charge pressure relief valve 7.

If the pressure in the high pressure line exceeds 450 bar, e.g. through a pressure shock, the forward high pressure relief valve 8c opens and allows oil to flow directly from the forward high pressure line 11 into the return line (i.e. into the reverse high pressure line 12) through the reverse charge check valve 9a. In this instance, the drive pump 4 is bypassed.

Under certain conditions of use, the drive motor 16 operates as a pump. Such a situation can arise, for example, if a hydrostatic stop is performed (e.g. rapid movement of the hydrostatic control lever from a drive position to a neutral position) or if an equipped vehicle, such as a combine harvester, is driving down a hill. In such a condition the motor is operating in braking mode. If left unchecked, the drive motor 16 might motor one or both of the drive pump 4 and its prime mover and damage might occur from e.g. overspeeding. Further, braking causes an increase in pressure in the return line and this pressure may rise above safety limits.

To reduce the chances of this happening, the brake flow valves 15a, 15b in the brake manifold 15 begin to close if the oil pressure in the return line section 12a between the motor 16 and the brake manifold 15 exceeds the rated limit for the particular system, e.g. 180 to 280 bar depending on the application. The selection of this pressure is preferably based on maximising the braking torque which can be provided by the prime mover. Generally, the braking torque applied to the prime mover 22 is proportional to the product of the pump displacement, which is machine speed dependent, and the pressure difference between the input and output port of the pump 4 (brake pressure). The braking torque is maximal at the start of a hydrostatic stop, when the squash plate is still at full displacement. If this product exceeds the maximum brake torque of the prime mover, the latter can no longer control the speed of the pump and overspeeding of the pump can occur. In order to prevent this, pressure limiter valves 15a, 15b start restricting the flow to the pump 4 if the pressure in the return line 12a between motor and brake manifold exceeds the predetermined limit pressure at the input to the pump. The pressure limiter valves create a pressure differential such that the pump 4 will not experience a pressure exceeding the pressure settings of the limiter valves 15a, 15b. The braking pressure experienced by the motor 16 is split into the set pressure applied to the pump and the pressure differential across the limiter valves.

Not all working fluid flows through the pressure limiter valves 15a, 15b, as working fluid is bled through the permanently open fluid restriction 15f. At low flow rates, corresponding to small pump displacements (e.g. under low speed conditions), the limiter valves may close completely, while all working fluid passes through the orifice passage 15f. In this case, the pressure experienced by the pump 4 may become higher than the set pressure, but there will be no high torque on the prime mover as, at the same time, the pump displacement is small. So, there is no hazard that the prime mover will start speeding up. In this manner, restriction 15f avoids more generation of heat by the pressure limiter valves 15a, 15b and maintains the transfer of the brake load on the pump 4 and the prime mover 22. However, it is clear that the system would also be effective in reducing the load on the prime mover if no such orifice passage would be present.

The oil flow through the brake flow valves 15a, 15b converts much of its energy into heat and thereby at least part of the brake energy is absorbed in the brake manifold 15. At a predetermined point in the closure of the brake flow valves 15a, 15b, the orifice passage 15f fully takes over the return of oil from the drive motor 16 to the drive pump 4 and the brake flow valves 15a, 15b are able to close fully from that point onwards.

Valves 15a and 15b can effectively limit the pressure on the input side of pump 4. The prime mover is arranged to operate in such a manner as to produce a substantially constant RPM to the drive pump 4 and is operable to sustain the reverse (braking) load which has been limited by the brake valves 15a and 15b. In this manner, it is possible to drive the vehicle downhill, without risk of the engine 22 overspeeding.

However, the pressure in the return line 12a between the motor and the brake manifold can increase to a level which damages the motor 16 or other components of the circuitry. In particular, when a hydraulic stop is executed, an immediate destroke of the swash plate would cause unallowable high pressure shocks. In case no brake flow valves would be present, this dangerous situation would be prevented by the operation of the multifunctional valve assembly 9. The pressure increase is sensed by the pressure limiter valve 9b which opens to bleed some oil to the forward end of the servo cylinder 4a, thereby counteracting the destroking command provided through the servo valve assembly 10. In this manner the transition of the pump 4 to neutral is attenuated.

However, due to the presence of the brake valves 15a and 15b, the pressure experienced by the limiter valve 9b cannot exceed the setting pressure of the brake valves, which pressure is much lower than the setting of the limiter valve itself. If no further means would be provided, a hydraulic stop would fully destroke the pump 4 and the pressure at the motor 16 would exceed safety limits.

In order to reduce the likelihood of this pressure shock from arising, at 400 bar the pressure limiter valve 15c opens and allows oil to flow to the forward cylinder of the servo cylinder assembly 4a. This oil flow comprises hydraulic feedback of the pressure in a feedback portion 12a of the return line 12, i.e. between the outlet of the motor 16 and the inlet or outlet side of the brake manifold 15, and is used by the servo cylinder 4a to attenuate the variation of the angle of the swash plate and thereby to control the output of the drive pump 4 to prevent excessive pressure shocks, e.g. to allow displacement of working fluid through the drive pump 4 so that the pressure does not rise above 400 bar. Valve 15c takes up the function of the standard limiter valve 9b for the braking mode. Lowering the setting pressure of the valve 9b is not an option, because such pressure limitation would prevent transmission of traction power in the reverse mode.

To make sure the pressure acting on the forward servo cylinder does not exceed charge pressure, the feedback oil flowing at 400 bar through the pressure limiter valve 15c opens a check valve 14 which connects the forward servo line directly to the charge pressure circuit.

Shock protection is provided in the brake manifold 15 by the pressure shock relief valve 15d, which opens if the pressure in the return line (reverse high pressure line 12) exceeds 450 bar and this allows oil to flow directly from the return line 12 into the forward high pressure line 11. This results in circulation of oil through a closed loop including the motor 16. This function is comparable to that of standard relief valve 9c where no brake manifold 15 is used. This closed loop flow tends to heat the working fluid.

When the hydrostatic lever is moved to reverse, the system operates in a similar manner to that of forward operation except that in this case the high pressure line 11 becomes the return line and the high pressure line 12 becomes the supply line. Drive oil flows through the brake valves 15a, 15b in the brake manifold 15. In case the reverse working pressure at the pump 4 exceeds the setting pressure of the brake valves 15a, 15b, the check valve 15e opens to allow further passage of oil towards the motor 16. In reverse, braking is performed by the drive motor 16 acting as a pump and its pressure being controlled by the multi-function valve 8 alone, rather than in the brake manifold 15.

When changing gear under certain conditions, the pressure in the system may cause difficulty in gear selection. Such a situation might occur, for example, in an equipped vehicle on a hill side. To assist in this gear selection, when a gear change is required an electric solenoid of the drive motor 16 is energised such that it moves the pressure release solenoid valve 16c to connect the charge pressure line through the shuttle spool valve 16a to the pressure release spool 16d. The pressure on the pressure release valve moves the spool 16d, thereby connecting the high pressure line 11 to the return line 12 and relieving the pressure in the system which eases gear selection.

As indicated above, in a complex hydraulic control system as described above, heat may be generated in a variety of control valves and flow restrictors. Preferably, the temperature of the working fluid should be kept within certain predefined limits. This can be done by a series of alarms, i.e. when the working fluid overheats, the driver receives a warning in the cab. It is preferred however if an automatic control of working fluid temperature is provided. Hence, a cooling means 18, e.g. a radiator, may be provided. However, such cooling means also has a limit as to the amount of heat it can remove and this heat energy will depend upon environmental temperatures. Hence, it is preferred in accordance with an embodiment of the present invention if an additional temperature control mechanism is provided.

Temperature sensor 19 is a temperature sensor which may be placed in any suitable part of the hydraulic circuit. It is shown as being placed to measure the temperature of the working fluid flushed from the motor 16. Ideally, the temperature of the working fluid should be measured at a position in the circuit immediately after a major heat source for the working fluid. The output of the temperature sensor 19 is provided to the electronic control device 20. The electronic control device 20 may include a microprocessor such as a Pentium III processor supplied by Intel Corp. USA, but it may also be implemented as a programmable digital logic device such as a programmable gate array, a field programmable gate array (FPGA), a programmable logic array (PLA), programmable array logic (PAL), etc. Although an electronic control device 20 has been described, alternative control systems may be used, e.g. a mechanical, a pneumatic or hydraulic control. In the traction mode (engine 22 is driving the pump 4 which drives the motor 16) the electronic control device 20 operates on the proportional solenoid valve 10a as described for the above embodiment and shown in FIG. 1 such as to reduce the power of the hydrostatic system when the temperature of the working fluid exceeds a predetermined value despite operation of the cooler 18. This predetermined value may be in the range 90 to 105° C., for example. The power delivered by the hydrostatic system depends on the position of a swash plate in the pump 4 and this is controlled via the valves 10a, 10c and the pump controller assembly 4a. Preferably, the control device 20 reduces the power by multiplying (or dividing) the factory set power level for a specific position of the lever 21 by a factor. Thus the effect of the control is to reduce the power control setting for all positions of the lever 21 in proportion to the value of the setting, i.e. if the factory setting is I then the reduced setting is x.I where x is a factor less than 1.

Preferably, the control device 20 performs a specific algorithm to control the power of the hydrostatic system in accordance with the temperature of the working fluid. An example of such an algorithm is shown in FIG. 2. The algorithm relates to the current I supplied by the electronic control device 20 to the solenoid valve 10a. In the initial step 100, the current $I_{max}$ as set by control device 20 is equal to $I_{set}$ the factory set value. This is the normal situation when the temperature of the working fluid is below the maximum permitted value. In step 102 it is determined whether the current temperature of the working fluid t is above the predetermined maximum allowed temperature $t_{lim}$. If YES in step 102, a local variable $t_{vor}$ is set to the current value of the temperature and the current $I_{max}$ is reduced immediately by a value proportional to $I_{set}$ for the current setting of the hydraulic lever 21 in step 104. The reduction may be 5% for instance. In step 106 a predetermined time period is allowed to lapse, e.g. 10 seconds as determined by a timer or by a system clock. In step 108, it is determined if the current temperature t has increased with respect to the local variable $t_{vor}$ which records the value of the temperature in step 104. If NO in step 108 the algorithm returns to step 102. If YES in step 108, it is determined in step 110 if the value of $I_{max}$ is below a predetermined value, e.g. 50%. If YES in step 110, the algorithm goes to step 114. In step 114 it is determined if the current temperature is below $t_{lim}$. If NO in step 114 a predetermined time period is waited in step 116, e.g. 10 seconds and step 114 is repeated. If YES in step 116 the algorithm goes to step 118. If NO in step 110 the local variable $t_{vor}$ is set to the new current temperature and the current Imax is reduced in step 112 by a larger factor than in step 104, e.g. by 10% of $I_{set}$. The algorithm returns to step 106.

If NO in step 102 or as a result of steps 110, 114, 116 it is determined in step 118 whether the current temperature is less than a predetermined amount (to allow safely for some hysteresis in the valve system) below the value $t_{lim}$, e.g. whether it is less than 2° C. below $t_{lim}$. If NO in step 118 the algorithm returns to step 102. If YES in step 118, a local variable $t_{vor}$ is set to the current value of the temperature of the working fluid and the value of $I_{max}$ is increased in step 120 by a predetermined amount, e.g. by 5% of the value of $I_{set}$. In step 122 it is determined if $I_{max}$ is the same or greater than $I_{set}$. If YES in step 122, the algorithm returns to step 100. Otherwise, in step 124 a predetermined time period is waited. This time period will generally be longer than the time period in step 106 to prevent hunting, e.g. 60 seconds. In step 126 it is determined if the value of the local variable $t_{vor}$ is greater than the current temperature. If YES in step 126, the algorithm returns to step 120. If NO in step 126, the algorithm returns to step 102.

In case the vehicle being driven by the hydraulic system comes to a stop for more than a predetermined time, e.g. 30 seconds, the algorithm can automatically restart at step 100.

An example of this temperature control is shown in FIG. 3. The curve A shows the temperature of the working fluid against time. The curve B shows the torque generated by the motor 16. Curve C shows the RPM of the motor 16. At time 1180 sec. the temperature of the working fluid exceeds the limiting temperature of 95° C. due to a high power operation which started at time 1030 sec. The power setting to the pump and therefore the RPM of motor 16 is then reduced in a series of steps every 10 seconds in accordance with the algorithm described with reference to FIG. 2. One step of 5% and 5 steps of 10% reduction are carried out. At this point the lower limiting value of step 110 has been reached and no further reductions are made. As the system is now operating at a lower power level the temperature of the working fluid begins to drop Once, the temperature drops below the limit temperature, the power setting of the pump 4 is increased in a series of steps each of 60 seconds and the RPM of the motor 16 is allowed to rise accordingly.

The skilled person will appreciate that present invention includes modifications to the above embodiments. For example, the embodiments of FIGS. 2 and 3 have been described with respect to step changes in pump throughput. The present invention includes gradual changes of pump throughput in accordance with corresponding signals from the pump controller. For example, the increase in step 120 may be implemented over a period long enough for the driver of the vehicle to compensate for any automatic changes, e.g. over a time period of 5 seconds. Visual and/or auditory alarms may indicate to the driver that power increase is being implemented automatically during this time. Also, the reduction in throughput of the pump in step 104 or 112 may be implemented gradually over a time period, e.g. 2 seconds. Visual and/or auditory alarms may indicate to the driver that power decrease is being implemented automatically during this time.

What is claimed is:

1. A control arrangement for a hydraulic system, comprising a variable throughput hydraulic pump connected with a hydraulic motor by a supply line and a return line for transfer of working fluid, and a pump controller mechanism adapted to vary the throughput of said pump, the pump driving the motor in a traction operation mode and the motor driving the pump in a braking mode wherein said control arrangement includes a first feedback element which provides to said pump controller mechanism first feedback of a temperature of the working fluid, said pump controller mechanism being adapted to vary the throughput of said pump in response to said feedback, wherein the pump controller mechanism is adapted to reduce the throughput of the pump when the temperature of the working fluid exceeds a first temperature, wherein said first feedback element is a temperature sensor for sensing the temperature of the working fluid and wherein the pump controller mechanism is adapted to reduce the throughput of the pump by a first amount when an output of the temperature sensor indicates that the working fluid has first exceeded the first temperature, wherein the pump controller mechanism is adapted to reduce the throughput of the pump by a second amount when the temperature of the working fluid does not drop below the first temperature after a first predetermined time period.

2. A control arrangement according to claim 1, wherein the pump controller mechanism is adapted to reduce the throughput of the pump by a third amount when the temperature of the working fluid does not drop below the first temperature after a second predetermined time period.

3. A control arrangement according to claim 2, wherein the reduction by the first amount is the reduction by a first factor.

4. A control arrangement according to claim 3, wherein the reduction by the second amount is the reduction by a second factor.

5. A control arrangement according to claim 4, wherein the reduction by the third amount is the reduction by a third factor.

6. A control arrangement according to claim 5, wherein the pump controller mechanism is adapted to increase the throughput of the pump by a fourth amount when the temperature of the working fluid drops below the first temperature.

7. A control arrangement according to claim 6, wherein the pump controller mechanism is adapted to increase the throughput of the pump by a fifth amount when the temperature of the working fluid does not exceed the first temperature after a third predetermined time period.

8. A control arrangement according to claim 7, wherein the increase by the fourth amount is the increase by a fourth factor.

9. A control arrangement according to claim 8, wherein the increase by the fifth amount is the increase by a fifth factor.

10. A control arrangement according to claim 9, wherein said control arrangement includes a second feedback element which provides to said pump controller mechanism during the braking mode a second feedback of a pressure in at least a feedback portion of said return line, said pump controller mechanism being adapted to vary the throughput of said pump in response to said second feedback, said return line including a braking flow control element adapted to control the flow of a working fluid in said return line and said feedback portion being located in said return line between said motor and an outlet of said braking flow control element.

11. A control arrangement according to claim 10, wherein said pump controller mechanism is adapted to limit, in response to said second feedback, an output pressure of said pump to a predetermined level.

12. A control arrangement according to claim 11, said hydraulic system further comprising a charge circuit and a check valve connecting said supply line and said charge circuit, said check valve being operable in response to said second feedback and being adapted, when operated, to connect said supply line and said charge circuit.

13. A control arrangement according to claim 12, said hydraulic system comprising a hydrostatic system.

14. A control arrangement according to claim 13, said second feedback comprising feedback of a return line pressure existing during a hydrostatic stop of said hydraulic system.

15. A control arrangement according to claim 14, said second feedback element comprising a pressure limiting valve.

16. A control arrangement according to any of the claim 15, said second feedback element providing a hydraulic feedback signal to said pump controller mechanism if the pressure in said feedback portion reaches or exceeds a predetermined pressure.

17. A control arrangement according to claim 16, said pump comprising a swash plate pump and said pump controller mechanism comprising a servo cylinder associated with said pump and which is adapted to vary the throughput of said pump by varying an angle of tilt of a swash plate of said pump.

18. A control arrangement according to claim 17, wherein the braking flow control element includes a permanently open flow restrictor.

19. A control arrangement according to claim 18, wherein the braking flow control element includes a pressure activated valve.

20. A control arrangement according to claim 19, wherein the flow restrictor is hydraulically in parallel with the pressure activated valve.

21. A method of controlling a hydraulic system, said system comprising a variable throughput hydraulic pump connected with a hydraulic motor by a supply line and a return line for transfer of working fluid, the pump driving the motor in a traction operation mode and the motor driving the pump in a braking mode, the method including the steps of: providing a first feedback of a temperature of the working fluid, and controlling the throughput of said pump in response to said feedback, wherein the throughput of the pump is reduced when the temperature of the working fluid exceeds a first temperature, wherein the throughput of the pump is reduced by a first amount when the working fluid has first exceeded the first temperature, wherein the throughput of the pump is reduced by a second amount when the temperature of the working fluid does not drop below the first temperature after a first predetermined time period.

22. A method according to claim 21, wherein the throughput of the pump is reduced by a third amount when the temperature of the working fluid does not drop below the first temperature after a second predetermined time period.

23. A method according to claim 22, wherein the reduction by the first amount is the reduction by a first factor.

24. A method according to claim 23, wherein the reduction by the second amount is the reduction by a second factor.

25. A method according to claim 24, wherein the reduction by the third amount is the reduction by a third factor.

26. A method according to claim 25, wherein the throughput of the pump is increased by a fourth amount when the temperature of the working fluid drops below the first temperature.

27. A method according to claim 26, wherein the throughput of the pump is increased by a fifth amount when the temperature of the working fluid does not exceed the first temperature after a third predetermined time period.

28. A method according to claim 27, wherein the increase by the fourth amount is the increase by a fourth factor.

29. A method according to claim 28, wherein the increase by the fifth amount is the increase by a fifth factor.

30. A method according to claim 29, further comprising the steps of:

controlling the flow of a working fluid in a first portion of the return line adjacent to the pump during the braking mode so that the inlet pressure to the pump is less than a predetermined value; and providing a second feedback of a pressure in at least a second portion of the return line, said second portion being located in said return line between said motor and the first portion; and controlling the throughput of said pump in response to said second feedback.

31. A method according to claim 30, including limiting an output pressure of said pump to a predetermined level in response to said second feedback.

32. A method according to claim 31, said hydraulic system comprising a hydrostatic system.

33. A method according to claim 32, wherein said second feedback providing step comprises feeding back a return line pressure existing during a hydrostatic stop of said hydraulic system.

34. A method according to claim 33, further comprising the step of limiting the pressure in the second portion to a predetermined level.

35. A method according to claim 34, further comprising providing a hydraulic feedback signal to said pump controller if the pressure in said second portion reaches or exceeds a predetermined pressure.

36. A method according to claim 35, further comprising providing a permanent working fluid leak path between the second and first portions.

37. A method according to claim 36, wherein said pump comprises a swash plate pump, said method further comprising the step of varying the throughput of said pump by varying an angle of tilt of a swash plate of said pump.

* * * * *